United States Patent [19]
Suter

[11] 3,841,460
[45] Oct. 15, 1974

[54] PALLETIZED CARGO DISCHARGE APPARATUS FOR CONVEYORS

[75] Inventor: Walter Suter, Buchs, Switzerland

[73] Assignee: Oehler-, Wyhlen-Lagertechnic, AG, Aarau, Switzerland

[22] Filed: Aug. 2, 1972

[21] Appl. No.: 277,160

[30] Foreign Application Priority Data
July 27, 1972  Switzerland................ 11575/71

[52] U.S. Cl............................................. 198/20 R
[51] Int. Cl............................................. B65g 47/00
[58] Field of Search ........ 198/20 R, 219; 193/35 SS

[56] References Cited
UNITED STATES PATENTS
1,486,984  3/1924  McKee................................ 198/219

FOREIGN PATENTS OR APPLICATIONS
801,649  9/1958  Great Britain................... 198/20 R
457,268  7/1968  Switzerland...................... 198/20 R

*Primary Examiner*—James B. Marbert
*Assistant Examiner*—Douglas D. Watts
*Attorney, Agent, or Firm*—Abraham A. Saffitz

[57] ABSTRACT

For discharging palletized cargo from roller conveyors, there is provided apparatus including lifting rails, a first, rigid frame and a second frame displaceable horizontally, a driving motor and a transmission for displacing the second frame. Both frames are connected to the lifting rails by a pivotal linkage so that rotation of the motor results in vertical reciprocation of the lifting rails which can pass between the rollers of the roller conveyor.

1 Claim, 3 Drawing Figures

PALLETIZED CARGO DISCHARGE APPARATUS FOR CONVEYORS

This invention relates to cargo discharge and transfer apparatus for conveyors; although it is by no means so restricted, it will hereinafter be particularly described with reference to its application to transfer palletised cargo from roller conveyors.

For transferring from continuous conveyors, such as e.g. roller conveyors, it has been the practice to enlarge the roller separation of the continuous conveyor at a discharge station so as to introduce therebetween gripping driving elements between the individual rollers, by means of which elements the cargo being transported is discharged from the conveyed stream. Transverse or cross conveyors have been used which are capable of being tipped up by a unilateral lever arrangement, whereby however the load is easily and undesirably tilted. A further disadvantage of these known transverse or cross conveyors consists in that they require a relatively large roller separation in the discharge zone or station which substantially precludes the conveying of small piece goods.

Further, so-called "conveying stools or transfer tables" have been proposed for discharge platforms, but these have a technically complex and costly construction and require so much space that their use for economically operating conveying plants becomes impossible in many cases. Consequently, in practice one uses mostly the above-mentioned, unilateral tilting by the transverse or cross conveyor through a one-sided lever which, however, has a significant disadvantage of tilting. In other words, the danger may arise of unsecured pallet loads slipping and thus colliding with something or falling off. For this reason it has already been proposed to employ vertically displaceable lifting rails which are raisable through gaps provided in the main conveyor. These lifting rails can be connected by a parallelogram linkage with the supporting frame of the main conveyor. This arrangement, however, has the drawback of large lateral movement of the lifting rails during their vertical displacement and brings with it large traverse paths. A further shortcoming of these known apparatuses consists in that they are not applicable universally but rather constitute "one-off" constructions adapted to single, individual cases of use. In today's large depots however, the greatest need is to have a larger number of discharge and transfer devices, and it would be economic, and particularly from the viewpoint of maintenance a great advantage, if one could employ a universally applicable discharge device therefor.

It is the aim of the present invention to propose apparatus which does not suffer from the defects of known devices. One such device of the above-mentioned type has two or more lifting rails which are displaceable vertically and in parallel, are arranged side by side but spaced from each other and are fixed so as to be transverse to the conveying driection of the roller conveyor between the rollers themselves. They are equipped with rotary conveying means running along these lifting rails, wherein a rigid frame is provided with which the lifting rails are each connected via two pivotable angle levers journalled in the frame According to the invention a further, horizontally displaceable frame is provided, which frame is connected with the free lever arm of the angle lever and is drivable by a motor via a connecting rod, an eccentric disc and gearing. It has been found expedient to construct the lifting rails as a chain conveyor having driven chains running along the rails.

The accompanying drawings represent, by way of example only, a preferred embodiment of the apparatus according to the invention, which will described in greater detail in what follows.

In the drawings:

FIG. 4 shows schematically the arrangement between conveyor rolls, seen from above.

Figure 1:
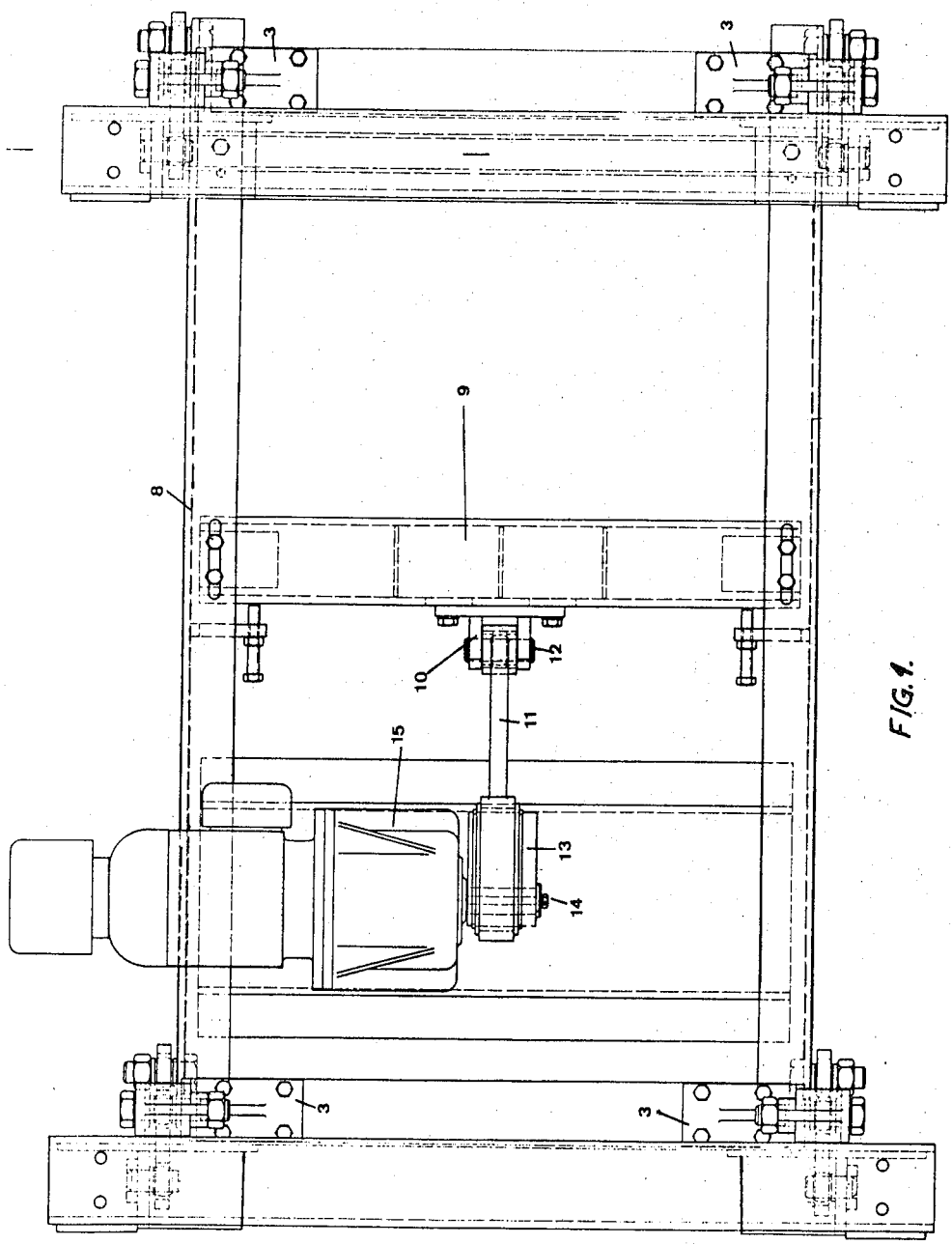
FIG. 1 is a top plan view of the cargo discharge apparatus according to the invention.

Referring to the drawings, the whole apparatus is essentially arranged from a frame assembled, for the sake of economy, from standard sections comprising two longitudinal beams 1 and two cross-beams 2. The cross beams 2 carry four bearing frame members 3 arranged in the corner region of the frame at each of which a toggle lever 5 is mounted for pivoting about a respective shaft 4. Each lever 5 has a longer lever arm 5a and a shorter lever arm 5b. Lifting rails 6 are arranged to extend parallel with the cross-beams 2 and are secured by means 7 to the end of the shorter lever arm 5b. The four corners of an additional frame 8 are secured to the longer arms 5a of the toggle lever 5 which frame fills the space of, and is substantially parallel to, the frame comprising the beams 1 and 2.

The frame 8 is provided with a central transverse traverse 9 which carries a securing device 10 for a connecting rod 11. This latter is at one end connected with the securing device 10 for pivoting around a shaft 12 and at its other end surrounds an eccentric disc 13 which is mounted on the output shaft 14 of an electric motor 15. It will therefore be appreciated that a rotary movement of the shaft 14 causes a translatory movement of the connecting rod 11 and thus of the frame 8. This movement of the frame has, in turn, the result that the individual toggle levers 5 and their axles 4 are rotated, whereby the lifting rails 6 secured to the shorter arm 5a of the toggle lever 5 move to-and-fro in a vertical direction.

Figure 2:
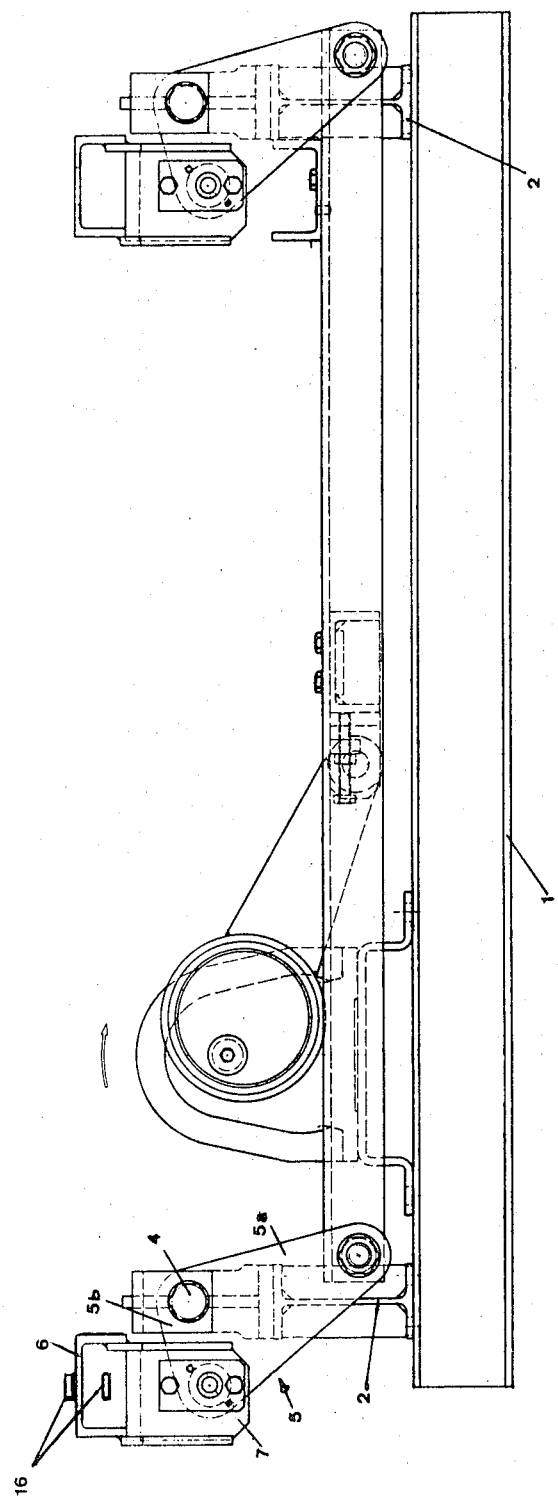
FIG. 2 is a side view thereof.
Figure 3:
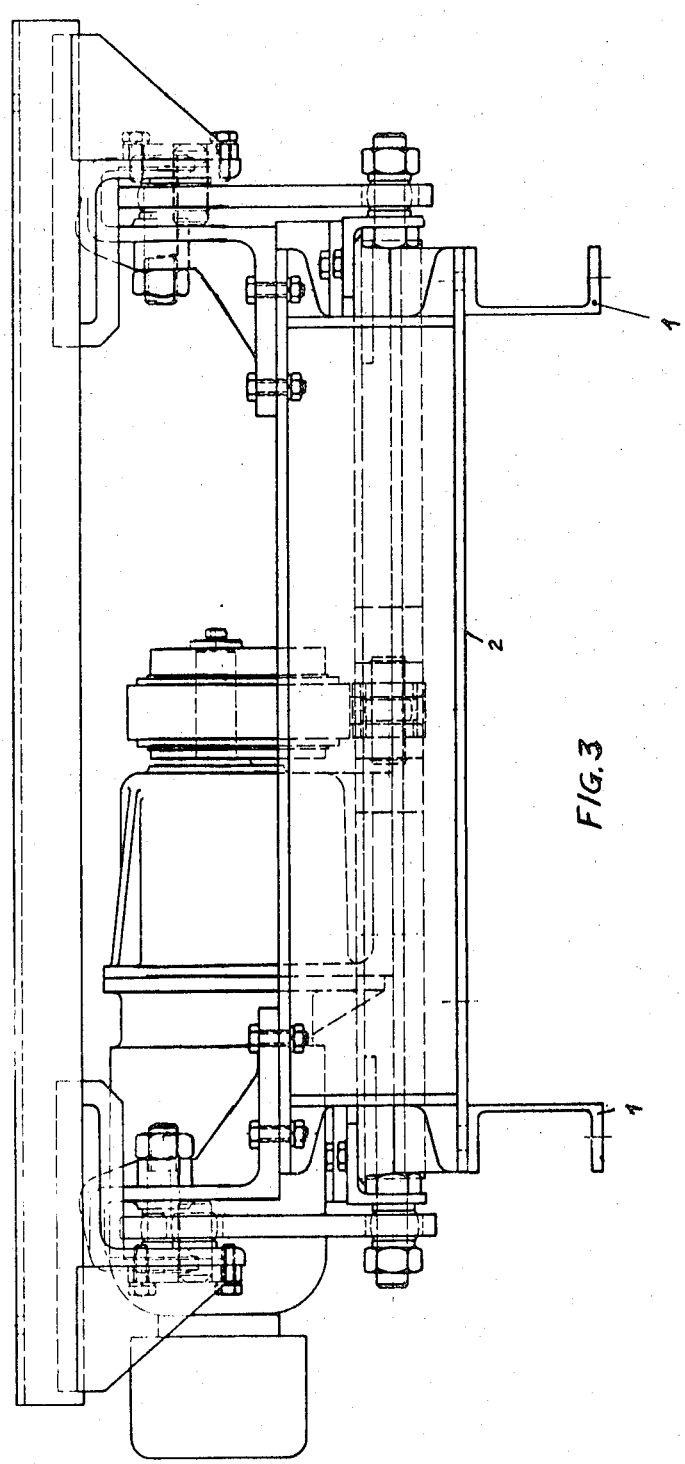
FIG. 3 is another side view.

As shown schematically in FIG. 2, the lifting rails may be constructed as chain conveyors, as has been proposed by the applicant, and described in Swiss Pat. No. 521,273. These comprise an endless chain 16 running along the rails 6, wherein the return course is guided within the rail profile.

The use of the proposed and above-described apparatus allows the transfer or roller separation of a roller conveyor to remain small in the vicinity of the discharge station, since only the two lifting rails 6 need to be pass or threaded through the rollers of the conveyor. It affords an absolutely parallel (or substantially so) lifting of the conveyed goods, whereby the danger of tilting and thus slipping of the pallet loads is reliably obviated. For a given application, the part which is decisive for the size of the apparatus, viz. the longitudinal beams 1, the cross-beams 2, the frame elements 8 and the lifting rails 6 can each time be cut to the required length from available standard sections in a trouble-free and economic manner, while the construction of the remaining parts may remain the same for nearly all applications. This means a considerably saving in cost in the manufacture and maintenance of the discharge apparatus.

FIG. 4 shows schematically the arrangement of the transfer and discharge device in a pallet conveyor system. Pallets arrive from A on a roller conveyor and wither are transferred to another conveyor in direction C or allowed to continue towards B. The lifting rails 2 of the transfer device fit well into the space between the conveyor frame 21 and the rolls 22.

I claim as my invention:

1. A lifting rail mechanism for cargo discharge comprising:
   a rigid support frame having parallel longitudinal beams and vertical members at the ends thereof for lifting supporting vertically displaceable rail means;
   a rectangular second frame formed of spaced apart beams and cross beams overlying said rigid frame;
   toggle levers pivotally mounted on said vertical member of said rigid frame, said toggle levers each having a short arm adapted to lift the lifting rail means of the mechanism and a long arm secured to the corner at each of the four corners of said second frame;
   lifting rail means having rails spaced apart which are pivotally connected in their corners to the short arm of each of said toggle means;
   driving means reciprocating said second frame member which includes a rotary motor and eccentric disc mounted thereon for converting the rotary output of said motor into linear reciprocating motion of said second frame members; and,
   chain conveying means associated with said lifting member having a driven chain running along said rail means.

* * * * *